United States Patent [19]

Wirth

[11] Patent Number: 4,724,741
[45] Date of Patent: Feb. 16, 1988

[54] HYDRAULIC SPRING-LOADER CYLINDER WITH WEAR ADJUSTMENT

[75] Inventor: Xaver Wirth, Ismaning, Fed. Rep. of Germany

[73] Assignee: Knorr-Bremse AG, Munich, Fed. Rep. of Germany

[21] Appl. No.: 903,923

[22] Filed: Sep. 5, 1986

[30] Foreign Application Priority Data

Sep. 6, 1985 [DE] Fed. Rep. of Germany ....... 3531896

[51] Int. Cl.⁴ .............................................. F15B 15/26
[52] U.S. Cl. .................................... 91/41; 188/71.8;
                                            188/196 A; 188/351
[58] Field of Search .................. 91/459, 471, 44, 41;
                                            188/196 A, 351, 71.8

[56] References Cited

U.S. PATENT DOCUMENTS

| | | | |
|---|---|---|---|
| 2,988,058 | 6/1961 | Warnecke | 91/44 X |
| 3,118,520 | 1/1964 | Tjernstrom | 188/196 A |
| 3,586,138 | 6/1971 | Engle | 91/44 X |
| 4,214,795 | 7/1980 | Kakuminato | 91/41 X |

*Primary Examiner*—Edward K. Look
*Attorney, Agent, or Firm*—Pollock, Vande Sande & Priddy

[57] ABSTRACT

Spring-loaded cylinder with a tension piston (7) which can be pressurized by a pressure medium. Between the tension piston (7) and a piston rod (3) movable thereby, a cylinder-piston arrangement (19, 20, 21) is installed, whose cylinder chamber (21) can be pressurized from the pressurization chamber (10) of the tension piston (7) via a sealing ring (18), constituting a reflux valve. A first axial friction coupling (17, 18) is provided between the tension piston (7) and the piston rod (3) and a second friction coupling (13, 14) between a housing section (1) and the piston rod (3). The second friction coupling (13, 14) has a buffer clearance A, corresponding to the nominal application stroke. The friction force of the first friction coupling (17, 16) is greater than the expansion force of the cylinder-piston arrangement (19, 20, 21), and the friction force of the second friction coupling (13, 14) is greater than the friction force of the first friction coupling (17, 16) reduced by the expansion force. The cylinder chamber (21) of the cylinder-piston arrangement (19, 20, 21) can be randomly emptied into the pressurizing chamber (10) of the tension piston (7).

11 Claims, 1 Drawing Figure

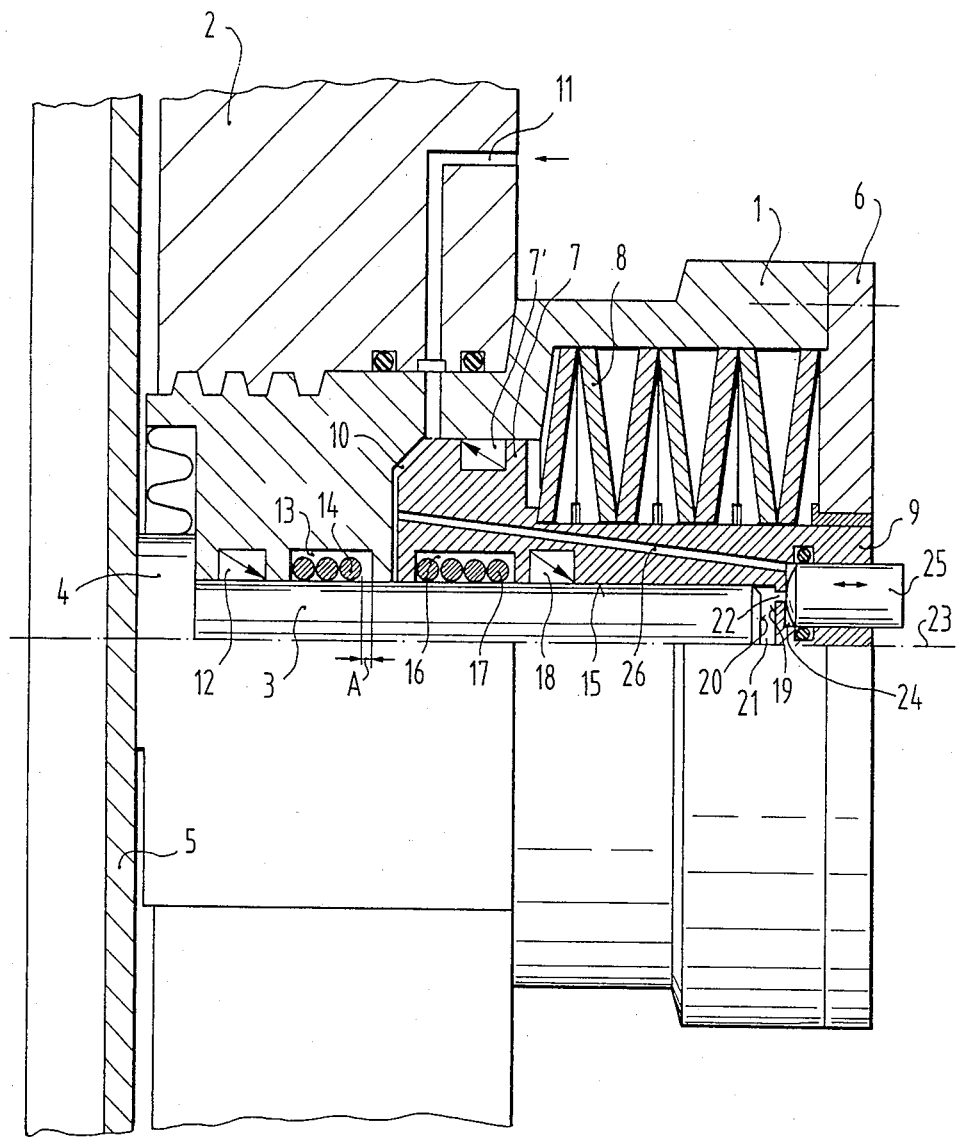

HYDRAULIC SPRING-LOADER CYLINDER WITH WEAR ADJUSTMENT

FIELD OF THE INVENTION

The invention concerns a hydraulic spring-loaded cylinder with wear adjustment with a tension piston that can be pressurized by a pressure medium against the force of a pre-loaded spring, which is coupled axially, in an adjustable manner, to a piston rod by means of a wear adjustment device.

It is the object of the invention to disclose such a hydraulic spring-loaded cylinder with a simple, inexpensive construction; if needed, a remote control emergency reset can be provided, also by simple means.

SUMMARY OF THE INVENTION

This problem is solved, according to the invention, by inserting between the tension piston and the piston rod a cylinder piston arrangement whose cylinder chamber can be pressurized from the pressurizing chamber of the tension piston by means of a reflux valve, by coupling the tension piston to the piston rod by means of a first axial friction coupling with higher frictional force than the expansion force which can be exerted by the cylinder-piston arrangement under pressurizer influence, and by inserting between a fixed housing section and the piston rod a second axial friction coupling whose frictional force is greater than the frictional force of the first friction coupling reduced by the tension force and in whose power flow there is a buffer coupling with play corresponding to the nominal stroke.

According to the further aspect of the invention, it is possible to provide a simple emergency reset for such a spring-loaded cylinder by connecting the cylinder chamber of the cylinder-piston arrangement to the pressurizing chamber by means of a randomly controllable valve. Remote control of the emergency reset thus is easily possible, according to the further invention, due to the fact that the valve can be remotely controlled, and is constructed, in particular, as a manually controllable magnetic valve.

BRIEF DESCRIPTION OF THE DRAWING

The drawing shows, schematically and partially in section, a spring-loaded cylinder according to the invention.

DETAILED DESCRIPTION

The spring-loaded cylinder shown in the drawing is designed as brake actuating cylinder for a vehicle disc brake, wherein the essentially axially stepped, cylindrical housing section 1 of the spring-loaded cylinder is held in a caliper 2 of which only the relevant parts are shown. The piston rod 3 of the spring-loaded cylinder abuts a brake shoe 5 of the disc brake, set adjustably on bearings in the caliper 2, with its top piece 4 protruding from the housing section 1.

The housing section 1 is closed off by a housing bottom 6 on the end remote from the brake shoe 5. Between the housing bottom 6 and a tension piston 7, sealed and adjustably guided in the housing section 1, a spring packet consisting of diaphragm springs 8, is clamped in as a pre-loaded spring; other types of springs may of course be used in place of the diaphragm springs 8. The tension piston 7 has a projection 9, protruding through the diaphragm springs 8, which is adjustably guided in the housing bottom 6. On the side remote from the diaphragm springs 8 there is, between the tension piston 7 and the housing section 1, a pressurizing chamber 10, which can be pressurized with a hydraulic pressure medium through a channel 11.

The piston rod 3 is adjustably guided and sealed by means of a sealing ring 12 near the end of the housing section 1 adjacent to the brake shoe 5. Next to the sealing ring 12 an annular recess 13, open towards the piston rod 3, is provided inside the housing section 1. Within the annular recess 13 is a clamping spring 14 which surrounds the piston rod 3 with friction hold, but has play towards the bottom of the annular recess 13. When setting the clamping spring 14 towards one axial end of the annular recess 13, the clamping spring 14 has axial play A towards the other end of the annular recess, corresponding to the nominal stroke during actuation of the disc brake. The piston rod 3 extends through the pressurizing chamber 10 and reaches axially adjustably into a pocket 15 of the tension piston 7, open towards the pressurizing chamber 10, and the protrusion 9. Near the pressurizing chamber 10, the pocket 15 is enlarged by an annular recess 16, in which there is a clamping spring 17 with no more than slight axial play, which also sits on the piston rod 3 with friction hold and has play towards the bottom of the annular recess 16. Adjoining the annular recess 16, a sealing ring 18 is set into the wall of the pocket 15, which seals the annular gap between the piston rod 3 and the wall of the pocket 15 only in the flow direction from the bottom 19 of the pocket 15 towards the pressurizing chamber 10, but permits flow in the opposite direction. The sealing ring 18 may be a common axial groove ring, whose groove is turned towards the bottom 19, so that its sealing lips work like a reflux valve. The piston rod 3 ends just before the bottom 19 with a front surface representing a piston 20, a cylinder chamber 21 being present between the bottom 19 and the piston 20.

The bottom 19 is pierced by a small diameter bore 22, coaxial with the axis 23 of the spring-loaded cylinder, and having an opening 22 which can be sealed by means of a valve plunger 25 adjustably arranged in the bottom section of the protrusion 9, in a chamber 24, provided for in the protrusion 9. The valve plunger 25 can be shifted as desired by means of a device that is not shown; it can be, in particular, the actuator of a conventional magnetic valve, which is flanged against the free end of the protrusion 9 and which can be provided with a hand operated control for the valve plunger 25. In the rest position, the valve plunger 25 is pressed tightly against the opening of the bore 22 into the chamber 24. From the chamber 24, a channel 26, suitably constructed as a bore, leads through the protrusion 9 and the tension piston 7 into the pressurizing chamber 10.

The seal 7', which seals the tension piston against the housing section 1, and the sealing ring 12 are suitably constructed in such a manner that they prevent a leak of pressure medium from the pressurizing chamber 10; in the opposite direction they may be constructed as sealing or non-sealing.

The clamping spring 17, in connection with the walls of the annular recess, constitutes a first friction coupling 17, 16 between the tension piston 7 and the piston rod 3, which is almost without play, at least in the axial direction. The clamping spring 14, together with the annular recess 13, constitutes a second friction coupling 13, 14 between the housing section 1 and the piston rod 3, which has a play corresponding to clearance A. Through their connection to the pressurizing chamber 10, the annular recesses 13 and 16 are filled with hydraulic pressure medium, the friction couplings 13, 14 and 17, 16 thus are wet couplings with correspondingly little wear and constant friction behavior. The opening of the bore 22, together with the valve plunger 25, forms a valve 22, 25. The bottom 19, the piston 20 and the cylinder chamber 21 form a cylinder-piston arrangement 19, 20, 21 which can be pressurized from the pressurizing chamber 10, past the sealing ring 18—permeable in this direction—with hydraulic pressure medium and, with a lifted valve plunger 25, thus open valve 22, 25, can also again be evacuated into the pressurizing chamber 10 through the bore 22 and the channel 26.

The friction force of the first friction coupling 17, 16 is so calculated that its friction force is greater than the force exerted on the piston rod 3 by the piston 20 with pressurized cylinder chamber 21, thus higher than the expansion force between the bottom 19 and the piston 20. The friction force of the second friction coupling 13, 14 is so calculated that it is greater than the friction force of the first friction coupling 17, 16, reduced by the cited expansion force between the bottom 19 and the piston 20. It is possible, e.g., with any power unit, that the first friction coupling 17, 16 has a friction force with a value of 3, the second friction coupling 13, 14 a friction force with a value of 2.5 and the expansion force a value of 2.

When the spring-loaded cylinder is new or the pressure medium source is not under pressure and brake shoe 5 is unworn, the pre-loaded spring parts assume the position shown in the drawing, the piston rod 3 being pressed as far as possible to the right in the housing section 1, and the tension piston being in its left terminal position. The clearance A may then be fully to the right of the clamping spring 14. The channel 11, the pressurizing chamber 10, the two annular recesses 13 and 16, the cylinder chamber 21, the chamber 24 and the channel 26 are filled with non-pressurized hydraulic pressure medium.

If pressure medium is then fed into the channel 11 at high pressure, the pressurization by the pressurizing chamber 10 forces the tension piston 7 towards the right while compressing the diaphragm springs 8, the head piece 4 holding the piston rod 3 in place by its abutment against the housing section 1. The pressure medium flows into the enlarging cylinder chamber 21, past the sealing ring 18, so that the chamber 24 is also pressurized. By its displacemnt, the tension piston 7 overcomes the friction force of the first friction coupling 17, 16. The friction force of the second friction coupling 13, 14 prevents an expulsion of the piston rod 3 because of the pressurizing pressure of the piston 20 towards the left. The tension piston 7 remains immobile upon complete compression of the diaphragm springs 8.

It now becomes possible to reduce the pressure of the hydraulic pressure medium for the release play adjustment of the disc brake, the diaphragm springs 8 again shifting the tension piston towards the left. The hydraulic pressure medium cannot escape from the cylinder chamber 21, since the sealing ring 18 as well as the valve 22, 25 are blocking; the piston rod 3 thus is carried along by the tension piston 7, the friction force of the second friction coupling 13, 14 being overcome and the brake shoe 5 being applied and pressed against the disc brake (not shown) via the head piece 4. The application stroke may thus exceed the clearance A. For the subsequent release of the disc brake, it is again necessary to build up a high pressure medium pressure through channel 11, which has the effect of pressing the tension piston 7 to the right while compressing the diaphragm spring 8. The tension piston 7 carries along the piston rod 3 as well as the clamping spring 14 along via the friction force of the first friction coupling 17, 16, until the clamping spring 14 abuts the right-hand limit of the annular recess 13 after passing through the stroke corresponding to the clearance A. The friction force of the second friction coupling 13, 14, in conjunction with the pressurization of the piston 20, then holds the piston rod 3, while the tension piston 7 shifts further to the right up to its right terminal position, until the diaphragm springs 8 are fully compressed, while overcoming the friction force of the first friction coupling 17, 16. During this motion, pressure medium flows into the cylinder chamber 21 past sealing ring 18. After the completion of this movement, the disc brake is in its released position with the correct release play.

For subsequent brakings, the pressure medium pressure must be reduced, whereupon the overwhelming force of the diaphragm springs 8 actuates the disc brake accordingly. The filling of the cylinder chamber 21 with non-compressible hydraulic pressure medium assures the force transmission from the tension piston 7 to the piston rod 3. Release takes place in reverse order by re-establishing the pressure medium pressure. Wear of the brake shoe 5 or of other parts of the brake, which occurs during braking is already adjusted during such braking by a corresponding advance of the tension piston 7 with the piston rod 3, while the fixed clamping spring 14 remains in fixed position against the left-hand limit of the annular recess 13 in the housing section 1. During subsequent release of the brakes, the piston rod 3 only performs a shift to the right corresponding to the clearance A, while the tension piston 7 is moved to its full right terminal position under full compression of the diaphragm springs 8.

Should the pressure agent source fail, e.g. if a hose (not shown) leading from the pressure medium source to the channel breaks, the disc brake is applied with maximum force. If the disc brake is now to be released, emergency resetting of the spring-loaded cylinder is necessary. For this emergency resetting of the spring-loaded cylinder, the valve plunger 25 must be lifted from the opening of the bore 22 by a slight shift to the right, relative to the protrusion 9, i.e., the valve 22, 25 must be opened, which has the effect that the pressure medium in the cylinder chamber 21 can escape through the bore 22, the chamber 24 and the channel 26 into the non-pressurized pressurization chamber 10 and the pressure in the cylinder chamber 21 is thus also reduced. The disc brake now relaxes, whereby the brake shoe 5 and thus the piston rod 3 are pressed back to the right until the brake shoe 5 rests lightly against the brake disc. Only the friction force of the first friction coupling 17, 16 has to be overcome, while the clamping spring 14 of the second friction coupling 13, 14 moves freely only within the clearance A. When the valve plunger 25 is lifted from the bore 22, it is possible, under the power of the diaphragm springs 8, to obtain a leftward movement of the tension piston 7 until it reaches its left terminal position, however, this motion in no way prevents the emergency reset of the springloaded cylinder. As the valve plunger 25 can easily be coupled to a remote control, and could be, for example, as already mentioned, the lever of a magnetic valve, or be movable through a Bowden cable, the emergency reset of the spring-loaded cylinder can be effected with little extra effort by means of remote control from any desired location. This is particularly important when the spring-loaded cylinder is used as application cylinder for a rail vehicle friction brake; in case of failure it is a particular advantageous to perform an emergency reset of such a friction brake from the control cab, for example.

As a modification of the described embodiment it is also possible to substute for the valve 22, 25 a valve arranged at any desired location outside of the spring-loaded cylinder, which valve is connected both to the cylinder chamber 21 and to any desired hydraulic chamber which is non-pressurized during emergency reset, such as a hydraulic sump, non-pressurized storage container, directly or indirectly to the pressurization chamber 10 or the like.

What is claimed is:

1. Hydraulic spring-loaded cylinder with wear adjustment, with a tension piston (7) that can be pressurized by a pressurizing agent, contrary to the force of a pre-loaded spring (8), which is coupled adjustably by means of a wear adjustment device to a piston rod (3), wherein between the tension piston (7) and the piston rod (3) a cylinder-piston arrangement (19, 20, 21) is installed, of which the cylinder chamber (21) can be pressurized through a reflux valve (sealing ring 18) from the pressurizing chamber (10) of the tension piston (7), that the tension piston (7) is coupled to the piston rod (3) by means of a first axial friction coupling (17, 16), the friction force of which is higher than the expansion force which can be exerted by the cylinder-piston arrangement (19, 20, 21) under pressure from the pressurizing agent, and that between a fixed housing section (1) and the piston rod (3) a second axial friction coupling (13, 14) is arranged, the friction force of which is higher than the friction force of the first friction coupling (17, 16) reduced by the expansion force, and in the power flow of which there is a buffer coupling with a clearance (A) corresponding to the nominal stroke.

2. Spring-loaded cylinder according to claim 1, wherein the cylinder chamber (21) of the cylinder-piston arrangement (19, 20, 21) can be connected to the pressurizing chamber (10) by means of a randomly actuatable valve (22, 25).

3. Spring-loaded cylinder according to claim 2, wherein the valve can be directly actuated.

4. Spring-loaded cylinder according to claim 2 or 3, wherein the valve (22, 25) can be actuated by remote control.

5. Spring-loaded cylinder according to claim 4, wherein the valve is a hand operated magnetic valve.

6. Spring-loaded cylinder according to claim 1, wherein at least one of the friction couplings (13, 14; 17, 16) has a clamping spring (14; 17) that surrounds the piston rod (3).

7. Spring-loaded cylinder according to claim 6, wherein the piston rod (3) reaches into a pocket (15) of the tension piston (7), whereby the contact area between the two contains a seal (18), acting as a reflux valve, sealing in only one direction, and the clamping spring of the first friction coupling (17, 16) which is held axially at least substantially without play on one of said tension piston (7) and piston rod (3).

8. Spring-loaded cylinder according to claim 7, wherein the clamping spring (14) of the second friction coupling (13, 14) is held in an annular recess (14) of the housing section (1) with an axial clearance (A) corresponding to the nominal stroke.

9. Spring-loaded cylinder according to claim 7, wherein the clamping springs (14, 17) are located in annular recesses (13, 16) filled with pressure medium.

10. Spring-loaded cylinder according to one of the claims 7 to 9, wherein in the tension piston (7) a channel (26) which can be closed off by the valve (22, 25) leads from the bottom (19) of the pocket (15) to the pressurizing chamber (10).

11. Spring-loaded cylinder according to claim 10, wherein the valve (22, 25) comprises a valve plunger (25) which is mounted in the tension piston (7) in a parallel shiftable manner.

* * * * *